(12) United States Patent  (10) Patent No.: US 8,188,676 B2
Cusinato et al.  (45) Date of Patent: May 29, 2012

(54) SYSTEMS AND METHODS FOR DRIVING LIGHT-EMITTING DIODES

(75) Inventors: Paolo Cusinato, Villeneuve-Loubet (FR); Frederic Ballin, Frejus (FR); Lorenzo Indiani, Villeneuve-Loubet (FR); Philippe Perney, Cagnes sur Mer (FR); Gwenaelle Merrien, Nice (FR); Francois Bauduin, La Gaude (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/099,855

(22) Filed: May 3, 2011

(65) Prior Publication Data

US 2011/0204798 A1    Aug. 25, 2011

Related U.S. Application Data

(62) Division of application No. 11/960,429, filed on Dec. 19, 2007, now abandoned.

(30) Foreign Application Priority Data

Apr. 16, 2007    (EP) ..................................... 07290467

(51) Int. Cl.
*G05F 1/00*    (2006.01)

(52) U.S. Cl. ..... 315/291; 315/307; 315/247; 315/185 S; 315/312

(58) Field of Classification Search ................. 315/247, 315/224, 225, 209 R, 291, 297, 307–311, 315/312–326
See application file for complete search history.

(56) References Cited

U.S. PATENT DOCUMENTS

| | | | |
|---|---|---|---|
| 7,557,524 B2* | 7/2009 | Chevalier et al. | 315/318 |
| 7,573,211 B2* | 8/2009 | Liu | 315/307 |
| 7,592,756 B1* | 9/2009 | Wu et al. | 315/307 |
| 7,675,246 B2* | 3/2010 | Chiang et al. | 315/291 |
| 2003/0114951 A1* | 6/2003 | Breuer | 700/142 |
| 2010/0283544 A1* | 11/2010 | Ishikawa et al. | 330/277 |

* cited by examiner

*Primary Examiner* — Tuyet Thi Vo
(74) *Attorney, Agent, or Firm* — John R. Pessetto; W. James Brady; Frederick J. Telecky, Jr.

(57) ABSTRACT

At least some embodiments include a LED driver system. The system includes multiple branches of series-coupled LEDs, multiple current sources, and control logic. Each of the current sources is coupled to a separate branch of series-coupled LEDs. The control logic is coupled to the current sources, and is configured to regulate current through each branch based at least in part on a feedback voltage measured at a node in one of the branches.

2 Claims, 2 Drawing Sheets

SYSTEMS AND METHODS FOR DRIVING LIGHT-EMITTING DIODES

CROSS-REFERENCED TO RELATED APPLICATION

This is a divisional application of co-pending application Ser. No. 11/960,429, filed on Dec. 19, 2007, the entire disclosure of which is incorporated herein by reference. The co-pending application Ser. No. 11/960,429, filed on Dec. 19, 2007 claims priority to EP Application No. 07290467.5, filed on Apr. 16, 2007.

BACKGROUND

White light-emitting diodes ("WLEDs") are increasingly being used as backlights in portable equipment such as personal digital assistants, cellular telephones, and digital cameras. As with monochromatic LEDs, the brightness of a WLED is proportional to the current flowing through the WLED. Thus, in order to provide uniform illumination using WLEDs, it is important to ensure that the current flowing through each of the WLEDs is also uniform. Consistent current flow through a group of WLEDs may be achieved by connecting the WLEDs in series, but as WLEDs are coupled in series in this manner, the voltage needed to drive a series-coupled set of WLEDs increases and can exceed the voltage rating of the power supply available to drive the WLEDs. Contrastingly, the WLEDs may be driven in parallel (either individually or as short series branches that are coupled in parallel to each other) to avoid the need for high-voltage power supplies. However, the current in each branch must be carefully regulated to provide the desired uniformity in brightness among the WLEDs. Although WLEDS are mentioned throughout this disclosure, the systems and methods described herein are also well-suited for use with other LEDs (e.g., monochromatic LEDs).

SUMMARY

The present disclosure describes systems and methods for driving light-emitting diodes ("LEDs"). At least some embodiments include a LED driver system. The system includes multiple branches of series-coupled LEDs, multiple current sources, and control logic. Each of the current sources is coupled to a separate branch of series-coupled LEDs. The control logic is coupled to the current sources, and is configured to regulate current through each branch based at least in part on a feedback voltage measured at a node in one of the branches.

Other embodiments include a driver system. The driver system includes means for regulating current and means for providing a feedback voltage. The current is regulated through each of multiple branches, and the branches comprise series-coupled components. The branches are coupled in parallel. The current is regulated based at least in part on the feedback voltage, and the feedback voltage is measured at a node located after a final component, in the direction of current travel, in one of the branches Yet other embodiments include a method of driving LEDs. The method includes measuring voltages at multiple nodes. The nodes are in a multiple branches including one or more series-coupled LEDs, one node per branch. The plurality of branches coupled in parallel. The method also includes selecting one branch, and regulating current through each of the branches based at least in part on the voltage measured at the node in the selected branch.

BRIEF DESCRIPTION OF THE DRAWINGS

For a more complete understanding of the present disclosure, reference is now made to the accompanying drawings and detailed description, wherein like reference numerals represent like parts.

NOTATION AND NOMENCLATURE

Certain terms are used throughout the following claims and discussion to refer to particular system components. This document does not intend to distinguish between components that differ in name but not function. In the following discussion and in the claims, the terms "including" and "comprising" are used in an open-ended fashion, and thus should be interpreted to mean "including but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "system" refers to a collection of two or more hardware components, and may be used to refer to an electronic device or circuit, or a portion of an electronic device or circuit.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

White light-emitting diodes ("WLEDs") are increasingly used within mobile electronic devices in applications such as, for example, backlights for screens and keypads of personal digital assistants ("PDAs") and cellular telephones. Maintaining a uniform brightness is important in such applications, and such uniformity is accomplished by maintaining a consistent current in each of the WLED branches.

Figure 1:
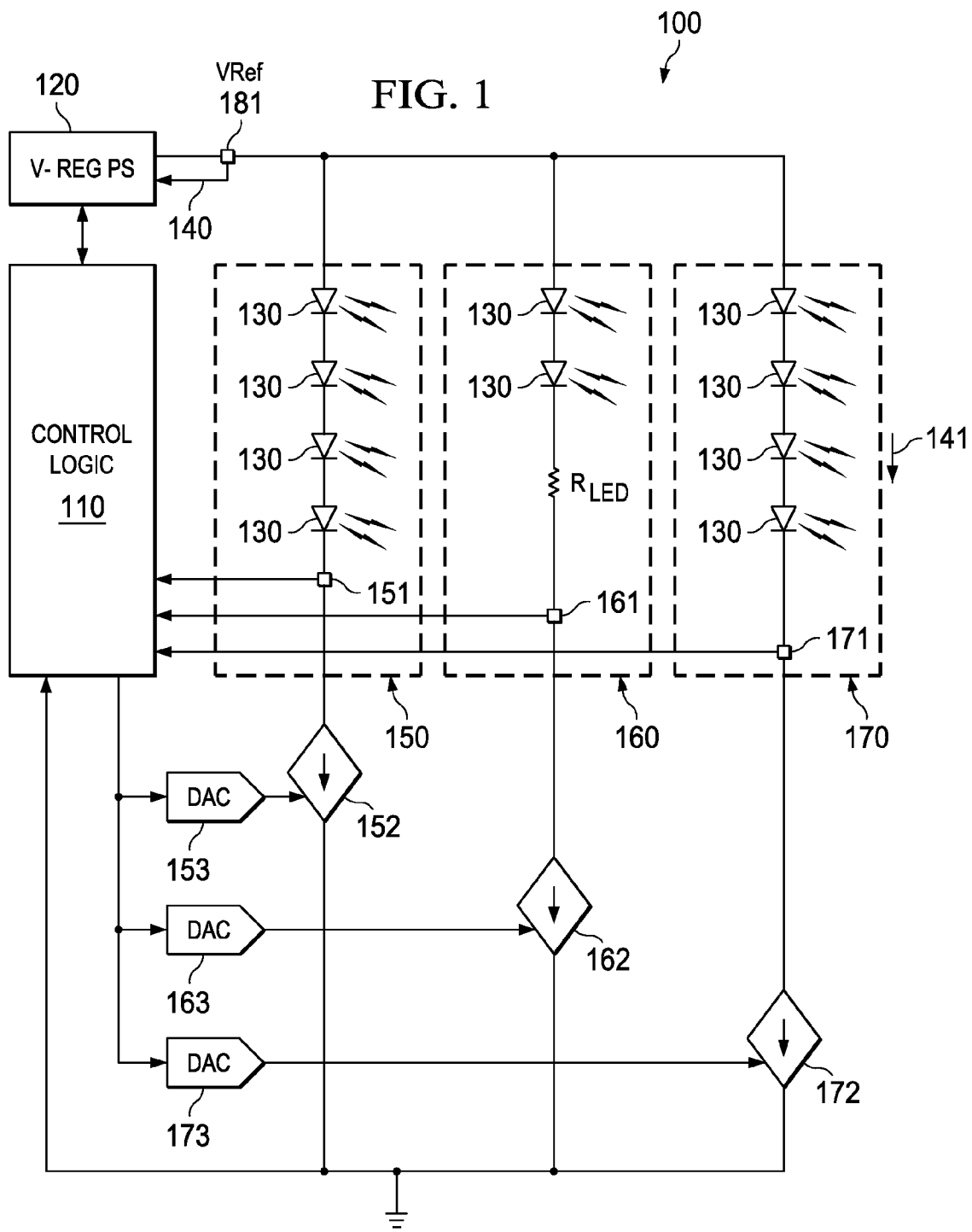
FIG. 1 illustrates a light-emitting diode ("LED") driver system in accordance with some embodiments of the present disclosure.

FIG. 1 illustrates a WLED driver system 100, which is designed to maintain a consistent current in each of the multiple branches 150, 160, and 170. The branches 150, 160, and 170 are preferably coupled in parallel to each other, and each branch comprises multiple WLEDs 130 coupled in series. The branches are coupled to, and receive power from, a voltage-regulated power supply 120.

Preferably, the power supply 120 generates a high enough voltage to counteract the voltage drop caused by the WLEDs. In the case of four WLEDs in series on a branch, the voltage generated by the power supply 120 may be as high as 17.2V in some embodiments. In such a case, each LED causes a 4V voltage drop and the remaining 1.2V is dissipated in the control logic 110. The voltage generated by the power supply 120 is controlled, to ensure a predictable and stable supply, based upon a feedback voltage using path 140 and pin 181. A pin is an electric interconnection such as a lead.

Voltage-controlled current sources 152, 162, and 172 are coupled to the branches 150, 160, and 170 respectively. The current sources 152, 162, and 172 are coupled in series with the WLEDs 130, and each current source can be enabled or disabled separately. Although the example of FIG. 1 shows three branches 150, 160, and 170 of series-coupled WLEDs 130, two branches with four WLEDs and one branch with two WLEDs, any number of branches may be used with any number of WLEDs in each branch, and all such combinations of branches and WLEDs are within the scope of the present disclosure. Preferably the different branches illuminate different portions of a mobile electronic device, e.g., a cellular telephone. Also, although WLEDS are mentioned throughout this disclosure, the systems and methods described herein are also well-suited for use with other LEDs, e.g., monochromatic LEDs.

Control logic 110 is coupled to digital-to-analog converters ("DACs") 153, 163, and 173 as well as the power supply 120. The control logic 110 is configured to provide a digital value to each DAC 153, 163, and 173, and each DAC is configured to convert the digital value into an analog reference voltage signal. Each DAC 153, 163, and 173 is also configured to provide the analog reference voltage signal to the corresponding current source 152, 162, and 172 respectively. Each current source 152, 162, and 172 is configured to use the analog reference voltage signal to set the current level flowing through the corresponding branch 150, 160, and 170 respectively. Preferably, the DACs accept 6-bit digital values, and the default value provided is 010101 corresponding to approximately 15.288 mA. As the 6-bit value is incremented by one, the current is preferably incremented by 0.728 mA. Therefore, in some embodiments, a range of current from 0 mA to 45.864 mA is possible (corresponding to the digital values 000000 to 111111) in each branch 150, 160, and 170.

Figure 2:
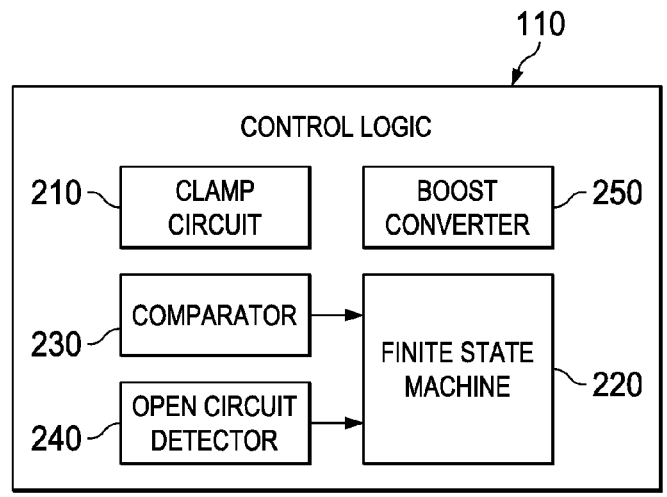
FIG. 2 illustrates control logic for the LED driver system in accordance with some embodiments of the present disclosure.

Considering FIGS. 1 and 2, the WLED driver 100 is preferably protected against excess power dissipation by a clamp circuit 210 in the control logic 110. Preferably, the clamp circuit 210 limits the voltage in a branch 150, 160, and 170 when the voltage drop due to any of the LEDs in the branch exceeds 5.5V. Also, a difference of more than 4.3V in the voltage drops of two branches 150, 160, and 170 preferably causes the clamp circuit 210 to limit the voltage in both branches. Once the clamp circuit limits voltage in a branch 150, 160, and 170, the DAC 153, 163, and 173 corresponding to the branch preferably does not affect the branch regardless of the digital value provided to the DAC.

In order to maintain current levels in each branch 150, 160, and 170, the control logic 110 preferably comprises a finite state machine 220 configured to select a branch to use for a feedback voltage (different from the feedback voltage for the power supply 120 using path 140). A finite state machine is circuit logic or a software algorithm that determines an output based on the value of inputs. Here, the finite state machine 220 determines the branch to use for feedback voltage based on the value of voltages at a node in each branch 150, 160, and 170. Preferably, the node in each branch is located after the final WLED 130 in the direction of current travel 141, and preferably, each node is located at a pin 151, 161, and 171. Preferably, the pins in the driver 100 outnumber the branches 150, 160, and 170 by one. Here, there is a pin 151, 161, and 171 on each branch and there is a pin 181 for the feedback voltage VRef. The four pins outnumber the three branches 150, 160, and 170 by one.

The voltages at the nodes are supplied to the control logic 110. Preferably, the control logic 110 comprises a comparator 230 that compares the voltage at each node with a stored voltage level (e.g., 1.2V). These comparisons are preferably supplied to the finite state machine 220 as inputs. A number of rules can be implemented, alone or in combination, by the finite state machine 220 regarding which branch 150, 160, or 170 should be selected. These rules include, but are not limited to, selecting a branch 150, 160, and 170 with a non-zero current magnitude, a branch that requires a highest voltage drop, or a branch that contains the most WLEDs. Preferably, the finite state machine 220 is configured to preclude selection of a branch 150, 160, or 170 if the voltage at a node is above the stored voltage level.

Once a branch is selected, the magnitude of current in each branch is regulated based on the voltage at the node in the selected branch. The current can be adjusted via the DACs 153, 163, and 173 for individual branch regulation, or via the power supply 120 for comprehensive regulation. Preferably, the digital values provided to each DAC 153, 163, and 173 are adjusted based on the voltage at the node in the selected branch 150, 160, or 170. Such adjustments cause the DACs 153, 163, and 173 to adjust the analog reference signal supplied to the current sources 152, 162, and 172, which causes the current traveling through each branch 150, 160, and 170 to adjust as well. If desired, the current traveling through each branch may also be regulated by adjusting the voltage delivered from the power supply 120 via the control logic 110.

The control logic 110 also preferably comprises an open circuit detector 240 configured to preclude selection of a branch 150, 160, or 170 containing an electrical break by the finite state machine 220 despite the branch, e.g., having the most number of WLEDs. If an open circuit is detected anywhere on a branch 150, 160, or 170, the open circuit detector 240 signals to the finite state machine 220 to select another branch and preclude selection of the branch containing the break. Preferably, the corresponding DAC 153, 163, or 173 is provided with the value 000000 in order to disable current in the branch 150, 160, or 170 in which the break has been detected. The control logic preferably also comprises a boost converter 250 to step up the voltage delivered to the branches to 15.2V (in the case of 4-WLED branches) as known in the art.

If any of the branches 150, 160, and 170 comprise less LEDs than another branch, the branch with less LEDs preferably comprises a resistor (e.g., $R_{LED}$ in branch 160) in order to dissipate voltage. Each branch is configured to have its current adjusted independently of currents in other branches.

The supply voltage required to drive multiple parallel branches of WLEDs is not as high as the supply voltage required to drive a like number of WLEDs that are coupled together in series. This lower supply voltage requirement permits the use of a power supply with a smaller capacity than the capacity necessary to drive series-coupled branches. In at least some embodiments, the smaller power supply is integrated on an electronic chip together with other components, e.g. the control logic 110. Due to the decreased voltage and power requirements, the current sources 152, 162, and 172 can also be reduced in size, making these components good candidates for chip integration as well.

Considering an example of the operation of the driver 100, upon activation of the power supply 120, control logic 110 loads default values into the DACs 153, 163, and 173, which preferably cause current sources 152, 162, and 172 to set the current in each branch 150, 160, and to 15 mA. The WLEDs 130 illuminate. The comparator 230 takes the difference of each voltage at the location of the pins 151, 161, and 171 and a stored voltage level of 1.2V. The comparator 230 provides the differences to the finite state machine 220. The finite state machine 220 is configured to select the branch that requires the highest voltage drop, but preclude selection of the branch if the difference supplied from the comparator 230 is negative. Accordingly, the finite state machine 220 selects branch 150. As such, the voltage delivered by the power supply 120 is adjusted as needed to maintain the magnitude of current in branch 150.

Preferably branches 150 and 170 are used to illuminate one or more screens of a cellular telephone, and therefore should provide the same illumination. Thus, because the branches 150 and 170 comprise the same number of WLEDs 130, the control logic 110 adjusts the value input into DAC 173 as needed to provide the same amount of current in branch 170 as in branch 150. Preferably, branch 160 illuminates the keyboard of the cellular telephone, and should provide a quarter of the illumination of branch 150. Therefore, the control logic 110 adjusts the value input into DAC 163 as needed to provide half of the amount of current in branch 160 as in branch 150. Because branch 160 comprises half the WLEDs of branch 150, a 50% reduction in current magnitude results in a 75% reduction in illumination when compared with branch 150.

The resistor $R_{LED}$ is used to dissipate any excess power outside the chip if current sources 152, 162, and 172 are integrated. The control logic 110 may also adjust the voltage generated by the power supply 120 in order to help maintain consistent illumination in each branch relative to the selected branch.

As time increases, the voltage dissipated by branch 150 begins to decrease below that dissipated by branch 170. Consequently, the finite state machine selects branch 170. As such, the voltage delivered by the power supply 120 is adjusted to maintain the magnitude of current in branch 170.

Preferably, the control logic 110 constantly monitors the performance of each branch 150, 160, and 170 in order to make similar selections and adjustments. Considering another example, the open circuit detector 240 detects a break in branch 160. Preferably the control logic loads a value of 000000 into DAC 163. Also, the finite state machine 220 is preferably precluded from selecting the branch 160, and the branch 160 is de-selected if currently selected. Reactions to special case scenarios, as well as other selection rules, can be programmed into the finite state machine.

Figure 3:
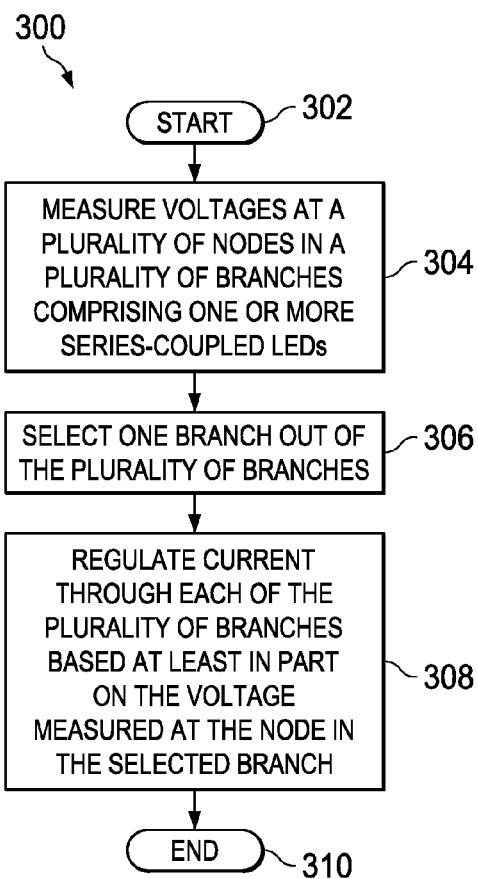
FIG. 3 illustrates a method of driving LEDs in accordance with in accordance with some embodiments of the present disclosure.

FIG. 3 illustrates a method 300 of driving WLEDs, in accordance with at least some embodiments, beginning at 302 and ending at 310. At 304, voltage is measured at the node in each branch. At 306, one of the branches is selected. The algorithm for selecting the branch may comprise a number of rules. These rules include, but are not limited to, selecting a branch with a non-zero current magnitude, a branch that requires a highest voltage drop, or a branch that contains the most WLEDs. Preferably, if the voltage at a node in a branch is above the stored voltage level, or if the branch contains an electrical break, the branch is precluded from being selected. At 308, the current through each branch is regulated based at least in part on the voltage measured at the node in the selected branch.

Numerous variations and modifications will become apparent to those skilled in the art once the above disclosure is fully appreciated. For example, although the embodiments described are shown driving white LEDs, the systems and methods described are equally applicable to other forms of light-emitting diodes, or any other electronic component, LED or otherwise, that requires precise, consistent, and regulated control of the current flowing through multiple components within an electronic device or circuit. Also, the use of WLEDs as backlights in a mobile electronic device is just one example of an application where consistent illumination of light sources (e.g., of WLEDs) is desirable. Other applications of the described systems and methods where consistent illumination is desirable will become apparent to those skilled in the art, and all such applications are intended to be within the scope of the present disclosure. It is intended that the following claims be interpreted to embrace all such variations and modifications.

What is claimed is:

1. A light-emitting diode ("LED") driver system, comprising
   a plurality of branches of series-coupled LEDs;
   a plurality of current sources, each of the plurality of current sources coupled to a separate branch; and
   control logic coupled to the plurality of current sources, the control logic configured to regulate current through each of the plurality of branches based at least in part on a feedback voltage measured at a node in one of the plurality of branches;
   wherein the control logic comprises a finite state machine configured to select the one of the plurality of branches comprising the node;
   wherein the finite state machine is configured to select a branch that contains the most LEDs as the one of the plurality of branches.

2. A method of driving light-emitting diodes (LEDs) comprising:
   measuring voltages at a plurality of nodes in a plurality of branches comprising one or more series-coupled LEDs, the plurality of branches coupled on parallel, one node per branch;
   selecting one branch out of the plurality of branches;
   regulating current through each of the plurality of branches based at least in part on the voltage measured at the node in the selected branch;
   wherein selecting the one branch comprises selecting a branch that contains the most LEDs as the one of the plurality of branches.

* * * * *